(12) United States Patent
Derckx et al.

(10) Patent No.: US 9,799,277 B1
(45) Date of Patent: Oct. 24, 2017

(54) DRIVING OF PIXELS IN ELECTROWETTING DISPLAYS

(71) Applicant: Amazon Technologies, Inc., Reno, NV (US)

(72) Inventors: Henricus Petronella Maria Derckx, Weert (NL); Johannes Wilhelmus Hendrikus Mennen, Budel (NL); Jozef Elisabeth Aubert, Roermond (NL)

(73) Assignee: Amazon Technologies, Inc., Seattle, WA (US)

( * ) Notice: Subject to any disclaimer, the term of this patent is extended or adjusted under 35 U.S.C. 154(b) by 330 days.

(21) Appl. No.: 14/316,524

(22) Filed: Jun. 26, 2014

Related U.S. Application Data

(60) Provisional application No. 61/936,518, filed on Feb. 6, 2014.

(51) Int. Cl.
*G09G 3/34* (2006.01)
*G02B 26/00* (2006.01)

(52) U.S. Cl.
CPC ......... *G09G 3/3433* (2013.01); *G02B 26/005* (2013.01); *G09G 2310/0202* (2013.01); *G09G 2310/08* (2013.01); *G09G 2330/028* (2013.01)

(58) Field of Classification Search
CPC ......... G09G 3/3433; G09G 2310/0202; G09G 2310/08; G09G 2330/028; G02B 26/005
See application file for complete search history.

(56) References Cited

U.S. PATENT DOCUMENTS

| | | | | |
|---|---|---|---|---|
| 4,769,637 A * | 9/1988 | Forrester | ............... | G09G 5/346 345/545 |
| 6,229,515 B1 * | 5/2001 | Itoh | ............ | G09G 3/3648 345/100 |
| 6,429,836 B1 * | 8/2002 | Hansen | ............ | G09G 3/22 345/100 |
| 2006/0284814 A1 * | 12/2006 | Ng | ............ | G09G 3/2092 345/98 |
| 2007/0069992 A1 * | 3/2007 | Smith | ............ | G09G 3/2014 345/76 |
| 2008/0278467 A1 * | 11/2008 | Hwang | ............ | G09G 3/3648 345/205 |
| 2013/0127817 A1 * | 5/2013 | Hwang | ............ | G09G 3/001 345/212 |

(Continued)

*Primary Examiner* — Vijay Shankar
*Assistant Examiner* — Abhishek Sarma
(74) *Attorney, Agent, or Firm* — Lee & Hayes, PLLC

(57) ABSTRACT

Subject matter disclosed herein relates to driving schemes that provide for improved data writing to pixels of electrowetting display devices. Subframes are defined within an input frame for providing data to pixels of an electrowetting display. Blocks of rows of pixels are also defined. The blocks are defined based upon driving schemes for the electrowetting display. In an embodiment, the driving schemes include a block driving scheme and an interlaced driving scheme. With a block driving scheme, the rows of pixels are grouped sequentially into blocks, i.e. block 1 includes rows 1-4, block 2 includes rows 5-8, etc. With an interlaced driving scheme, every Nth row is included in a block such that block 1 includes rows 1, 5, . . . , block 2 includes rows 2, 6, . . . , etc. Individual blocks are written to during the subframes thereby allowing for all rows to be handled during the input frame.

26 Claims, 12 Drawing Sheets

(56) References Cited

U.S. PATENT DOCUMENTS

2013/0307758 A1* 11/2013 Kim .................. G09G 3/22
  345/55
2014/0210876 A1* 7/2014 Xie ................ G09G 3/2092
  345/694

* cited by examiner

DRIVING OF PIXELS IN ELECTROWETTING DISPLAYS

CROSS REFERENCE TO RELATED APPLICATIONS

This claims priority to U.S. Provisional Patent Application No. 61/936,518, filed on Feb. 6, 2014, which is incorporated herein by reference.

BACKGROUND

Many portable electronic devices include displays for displaying various types of images. Examples of such displays include electrowetting displays (EWDs), liquid crystal displays (LCDs), electrophoretic displays (EPDs), light emitting diode displays (LED displays), etc. In EWD applications, a driving scheme is utilized to provide data and drive the pixels of the EWD. Generally, one of the points of emphasis for EWD applications is low power design since in today's applications, EWDs are intended to be used in mobile and portable media devices.

For the driving scheme, a dedicated gate scanning algorithm is utilized wherein for each input frame, each row of the EWD generally has to be written to twice. The first write action discharges the pixel to a reset level, which is also referred to as reset of the pixel. The second write action charges the pixel to the actual required display data value. The allowed time between the first write and second write action, also referred to as reset time, is generally restricted and typically ranges from 0.5 to 1.5 milliseconds. However, even with 1.5 milliseconds, it is generally not possible that all outputs can be addressed in a single full frame scan sequence. Thus, subframes generally need to be defined.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Figure 1A:
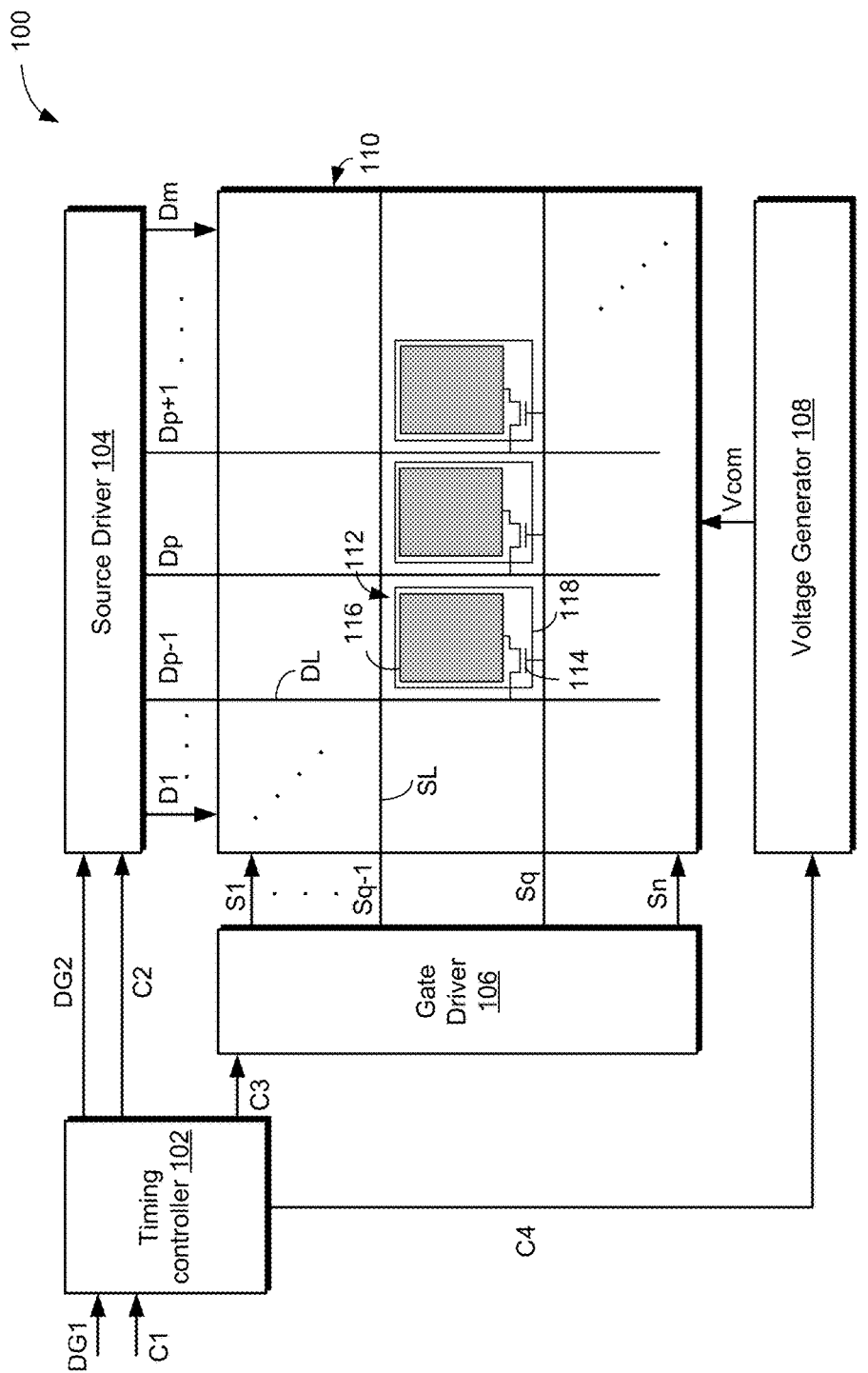
FIG. 1A is a schematic view of an example of an electrowetting display device, according to various embodiments.

The present disclosure provides driving schemes and techniques that provide for improved data writing to pixels of electrowetting display devices and reduced frequency of pixel resets by the electrowetting display devices.

In general, image display apparatuses, such as, for example, various electronic devices, including, but not limited to, portable computing devices, tablet computers, laptop computers, notebook computers, mobile phones, personal digital assistants (PDAs), and portable media devices (e.g., e-book devices, DVD players, etc.), display images on a display. Examples of such displays include, but are not limited to, LCDs, EWDs and EPDs.

More particularly, a display device, such as an electrowetting display device, for example, can be a thin film transistor electrowetting display (TFT-EWD) that generally includes an array of transmissive, reflective or transflective pixels configured to be operated by an active matrix addressing scheme. For example, rows and columns of pixels are operated by controlling voltage levels on a plurality of source lines and gate lines. In this fashion, the display device can produce an image by selecting particular pixels to transmit, reflect or block light. Pixels are addressed (e.g., selected) via source lines and gate lines that are connected to transistors (e.g., used as switches) included in each pixel. Transistors take up a relatively small fraction of the area of each pixel. For example, the transistor can be located underneath the reflector in reflective displays.

Electrically, the pixel is a small capacitor with a layer of insulating optical material (e.g., liquid crystal material or electrowetting material) sandwiched between two substrates, wherein each substrate generally includes a transparent conductive indium tin oxide (ITO) layer. A one-way current-passing characteristic of the transistor of the pixel prevents charge that is being applied to the pixel from draining between refresh cycles of the display's image.

An electrowetting display employs an applied voltage to change the surface tension of a liquid in relation to a surface. For instance, by applying a voltage to a hydrophobic surface via a pixel electrode in conjunction with a common electrode the wetting properties of the surface can be modified so that the surface becomes increasingly hydrophilic. Hydrophobic generally refers to repelling water or polar fluids while hydrophilic generally refers to having an affinity for water or polar fluids. As one example of an electrowetting display, the modification of the surface tension by applying a voltage causes the electrolyte, i.e. the polar fluid, in an electrowetting liquid in individual pixels of the display to adhere to the modified surface and thus, replace a colored electrowetting oil layer in individual pixels of the display. Thus, the electrowetting fluids in the individual pixels of the display responding to the change in surface tension act as an optical switch. When the voltage is absent, the colored electrowetting oil forms a continuous film within a pixel, and the color may thus be visible to a user of the display. On the other hand, when the voltage is applied to the pixel, the colored electrowetting oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the low power consumption of electrowetting displays in general makes the technology suitable for displaying content on portable display devices that rely on battery power.

For driving of electrowetting displays, a dedicated gate scanning algorithm is generally implemented. In general, a first write action discharges a pixel to a reset level, e.g., a black level voltage, which is also referred to as a reset of the pixel. A second write action generally charges the pixel to an actual required display data value. In general, the allowed time between the first write action and the second write action, also called the reset time, is restricted and typically ranges from 0.5 to 1.5 milliseconds. The latter time implies that not all outputs may be addressed in a single full frame scan sequence depending upon the size and resolution of the electrowetting display.

Thus, in accordance with various embodiments of the present disclosure, subframes are defined for an input frame. Blocks of rows of pixels are also defined. The blocks are defined based upon driving schemes for the electrowetting display. In an embodiment, the driving schemes include a block driving scheme and an interlaced driving scheme. With a block driving scheme, the rows of pixels are grouped sequentially into blocks, i.e. block 1 includes rows 1-4, block 2 includes rows 5-8, etc. With an interlaced driving scheme, every Nth row is included in a block such that block 1 includes rows 1, 5, . . . , block 2 includes rows 2, 6, . . . , etc. Individual blocks are written to during subframes thereby allowing for all rows to be handled during the input frame with a reduced frequency of resets of each pixel, which is more efficient.

Referring to FIG. 1A, an example of an electrowetting display device 100 is schematically illustrated that includes a timing controller 102, a source driver (data driver) 104, a gate driver (scan driver) 106, a voltage generator 108, and an electrowetting display panel 110. The electrowetting display panel 110 is driven by the timing controller 102, the source driver 104, the gate driver 106, and the voltage generator 108.

As an example of general operation of the electrowetting display device 100, responsive to a first data signal DG1 and a first control signal C1 from an external source, e.g., a graphic controller (not illustrated), the timing controller 102 applies a second data signal DG2 and a second control signal C2 to the source driver 104; a third control signal C3 to the gate driver 106; and a fourth control signal C4 to the voltage generator 108.

The source driver 104 converts the second data signal DG2 to voltages, i.e., data signals, and applies the data signals D1, . . . , Dp−1, Dp, Dp+1, . . . , Dm to the electrowetting display panel 110. The gate driver 106 sequentially applies scan signals S1, . . . , Sq−1, Sq, . . . , Sn to the electrowetting display panel 110 in response to the third control signal C3.

The voltage generator 108 applies a common voltage Vcom to the electrowetting display panel 110 in response to the fourth control signal C4. Although not illustrated in FIG. 1A, the voltage generator 108 generates various voltages required by the timing controller 102, the source driver 104, and the gate driver 106.

The electrowetting display panel 110 includes m data lines D, i.e., source lines, to transmit the data voltages and n gate lines S, i.e., scan lines, to transmit a gate-on signal.

Pixel areas 112 are positioned adjacent to crossing points of the data lines D and the gate lines S and thus are arranged in a grid of rows and columns. Each pixel area 112 includes a hydrophobic surface (not illustrated in FIG. 1A), and a thin film transistor 114 and a pixel electrode 116 under the hydrophobic surface. Each pixel area 112 may also include a storage capacitor (not illustrated) under the hydrophobic surface. A pixel wall 118, e.g., a partition wall, defines the pixel area 112. Pixel areas 112 can represent pixels within the electrowetting display device 100 or sub-pixels within the electrowetting display device 100, depending upon the application for the electrowetting display device 100.

Figure 1B:
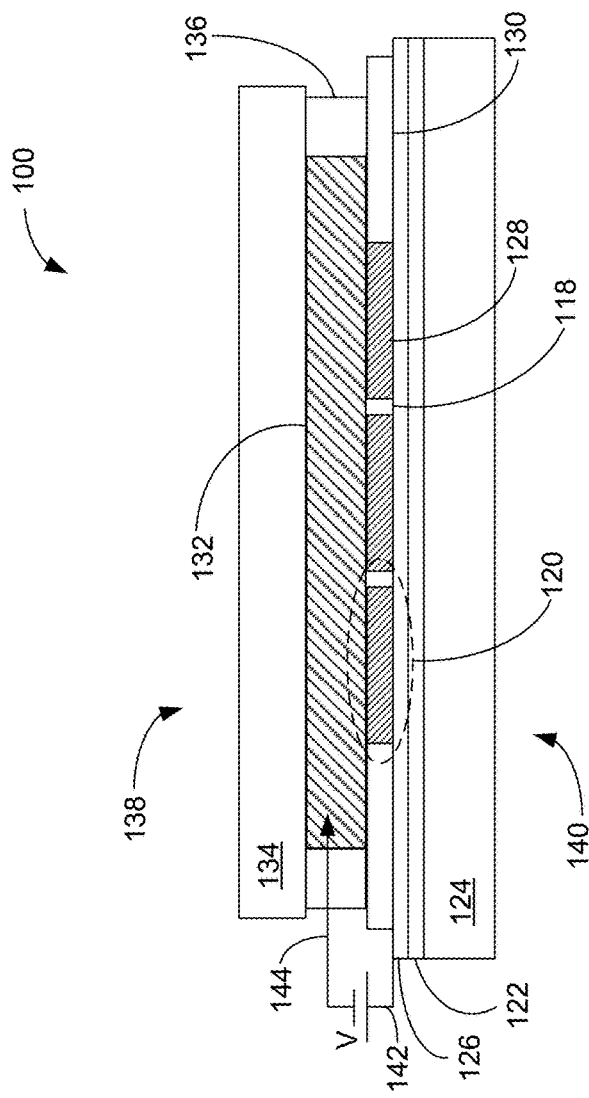
FIG. 1B is a cross-section of a portion of the electrowetting display device of FIG. 1A, according to some embodiments.

FIG. 1B is a cross-section of a portion of the electrowetting device 100 showing several electrowetting elements 120 that generally correspond to pixel areas 112, according to some embodiments. An electrode layer 122 that includes the pixel electrodes 116 (not illustrated in FIG. 1B) is formed on a bottom support plate 124. In some implementations, a dielectric barrier layer (not shown) may at least partially separate the electrode layer 122 from a hydrophobic layer 126 also formed on the bottom support plate 124 over the electrode layer 122. In some implementations, the hydrophobic layer 126 can comprise a fluoropolymer, such as, for example, AF1600, produced by DuPont, based in Wilmington, Del. The pixel walls 118 form a patterned electrowetting element grid on the hydrophobic layer 126, as can be seen in FIG. 1A. The pixel walls 118 may comprise a photoresist material, such as, for example, epoxy-based negative photoresist SU-8. The patterned electrowetting element grid comprises rows and columns that form an electrowetting element array (e.g., electrowetting display panel 110) of field electrowetting elements and border electrowetting elements. For example, an electrowetting element can have a width and length in a range of about 50 to 500 microns. A first fluid 128, which can have a thickness in a range of about 1 to 10 microns, for example, overlies the hydrophobic layer 126. The first fluid 128 is generally an electrowetting oil and is partitioned by the pixel walls 118 of the patterned electrowetting element grid. An outer rim 130 can comprise the same material as the pixel walls 118. A second fluid 132, such as a fluid that includes an electrolyte, overlies the first fluid 128 (e.g., the electrowetting oil) and the pixel walls 118 of the patterned electrowetting element grid.

The second fluid 132 is immiscible with the first fluid 128. Generally, immiscible refers to the inability of the second fluid 132 to mix or blend with the first fluid 128. The second fluid 132 generally includes an electrolyte and is electrically conductive or polar. The second fluid 132 may be water or a salt solution such as a solution of potassium chloride in a mixture of water and ethyl alcohol, for example. The second fluid 132 is preferably transparent, but may be colored, absorbing. The first fluid 128, generally referred to as electrowetting oil, is electrically non-conductive and may for instance be an alkane like hexadecane or (silicone) oil. The hydrophobic layer 126 is arranged on the bottom support plate 124 to create an electrowetting surface area. The hydrophobic character causes the first fluid 128 to adhere preferentially to the bottom support plate 124 since the first fluid 128 has a higher wettability with respect to the surface of the hydrophobic layer 126 than it has with respect to the second fluid 132. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

A top support plate 134 covers the second fluid 132 and edge seals 136 retain the second fluid 132 over the electrowetting element array. The bottom support plate 124 and the top support plate 134 may be separate parts of individual electrowetting elements or the bottom support plate 124 and the top support plate 134 may be shared by a plurality of electrowetting elements. The bottom support plate 124 and the top support plate 134 may be made of glass or polymer and may be rigid or flexible, for example.

A voltage V applied across the second fluid 132 and the dielectric barrier layer stack (e.g., the hydrophobic layer 126) of individual electrowetting elements can control transmittance or reflectance of the individual electrowetting elements.

The electrowetting display device 100 has a viewing side 138 on which an image for display formed by the electrowetting display device 100 can be viewed, and a rear side 140. The top support plate 134 faces viewing side 138 and the bottom support plate 124 faces the rear side 140. The top support plate 134 is coupled to the bottom support plate 124 with an adhesive or sealing material 136. In an alternative embodiment, the electrowetting display device 100 may be viewed from the rear side 140. The electrowetting display device 100 may be a reflective, transmissive or transreflective type. The electrowetting display device 100 may be a segmented display type in which the image is built up of segments. The segments can be switched simultaneously or separately. Each segment includes one electrowetting element 120 or a number of electrowetting elements 120 that may be neighboring or distant from one another. The electrowetting elements 120 included in one segment are switched simultaneously, for example. The electrowetting display device 100 may also be an active matrix driven display type or a passive matrix driven display, just to name a few examples.

The electrode layer 122 is separated from the first fluid 128 and the second fluid 132 by an insulator, which may be the hydrophobic layer 126. The electrode layer 122 (and thereby the electrodes 116) is supplied with voltage signals V by a first signal line 142 as will be further described herein. A second signal line 144 is electrically connected to a top electrode (not illustrated) that is in contact with the conductive second fluid 132. This top electrode may be common to more than one electrowetting element 120 since the electrowetting elements 120 are fluidly interconnected by and share the second fluid 132 uninterrupted by the pixel walls 118. The electrowetting elements 120 are controlled by the voltage V applied between the first and second signal lines 142 and 144.

The first fluid 128 absorbs at least a part of the optical spectrum. The first fluid 128 may be transmissive for a part of the optical spectrum, forming a color filter. For this purpose, the first fluid 128 may be colored by addition of pigment particles or dye, for example. Alternatively, the first fluid 128 may be black (e.g., absorbing substantially all parts of the optical spectrum) or reflecting. The hydrophobic layer 126 may be transparent or reflective. A reflective layer may reflect the entire visible spectrum, making the layer appear white, or part of it, making it have a color.

When the voltage V applied between the signal lines 142 and 144 is set at a non-zero active signal level, the electrowetting element 120 will enter into an active state. Electrostatic forces will move the second fluid 132 toward the electrode layer 122, thereby repelling the first fluid 128 from the area of the hydrophobic layer 126 to the pixel wall 118 surrounding the area of the hydrophobic layer 126, to a droplet-like shape. This action uncovers the first fluid 128 from the surface of the hydrophobic layer 126 of the electrowetting element 120. When the voltage across the electrowetting element 120 is returned to an inactive signal level of zero volts or a value near to zero volts, the electrowetting element 120 will return to an inactive state, where the first fluid 128 flows back to cover the hydrophobic layer 126. In this way, the first fluid 128 forms an electrically controllable optical switch in each electrowetting element 120.

Generally, the thin film transistor 114 includes a gate electrode that is electrically connected to a corresponding scan line of the scan lines S, a source electrode that is electrically connected to a corresponding data line (e.g., first signal line 142 of FIG. 1B) of the data lines D, and a drain electrode that is electrically connected to the pixel electrode 116. Thus, the pixel areas 112 are operated, i.e. driving of the electrowetting display 100, based upon the scan lines S and the data lines D of FIG. 1A.

For driving of electrowetting displays via the scan lines S and the data lines D, a dedicated gate scanning algorithm may generally be implemented. Within each input frame, each row (corresponding to the scan lines S) of electrowetting elements 120 (i.e. pixel area 112) within the electrowetting display 100 generally needs to be written to twice. On occasion, the amount of writing can be more, depending on the actual drive scheme implementation. In general, the first write action discharges an electrowetting element 120 to a reset level, e.g., a black level voltage, which is also referred to as a reset of the pixel. The second write action generally charges the electrowetting element 120 to an actual required display data value. In general, the allowed time between the first write action and the second write action, also called the reset time, is restricted and typically ranges from 0.5 to 1.5 milliseconds. The latter time implies that not all outputs may be addressed in a single full frame scan sequence depending upon the size and resolution of the electrowetting display 100. Thus, in accordance with various embodiments of the present disclosure, subframes are defined for input frames.

In accordance with one embodiment of the present disclosure, a block driving scheme for the electrowetting display panel 110 is implemented. In such a block driving scheme, the gate driver 106 is divided into a number N of blocks. For an example, assume there are 512 lines or rows (corresponding to scan lines S) in the electrowetting display panel 110 and there are four blocks (more or fewer lines and/or blocks may be included if desired). By setting the start line of each block, it is possible to drive all of the lines or rows of the electrowetting display panel 110 during an input frame via eight defined subframes (based upon the four blocks). For example, since there are four blocks defined, then in subframes 1 and 2, lines 1, 2, 3, . . . , 128 are defined for a first block for resetting and display data writing, respectively. In subframes 3 and 4, lines 129, 130, 131, . . . , 256 are defined for a second block for resetting and display data writing, respectively. In subframes 5 and 6, lines 257, 258, 259, . . . , 384 are defined for a third block for resetting and display data writing, respectively. In subframes 7 and 8, lines 385, 386, 387, . . . , 512 are defined for a fourth block for resetting and display data writing, respectively. Thus, for lines or rows S 1-512 of electrowetting display elements 120, the gate driver 106 can selectively reset the corresponding electrowetting elements 120 via first write actions during a first set of subframes, i.e. subframes 1, 3, 5 and 7, and then charge the corresponding electrowetting elements 120 to display data values via second write actions during a second set of subframes, i.e. subframes 2, 4, 6 and 8.

Accordingly, in each subframe, only one quarter of the total lines of the electrowetting display panel are selected for reset and data signal reception, respectively.

Figure 2:
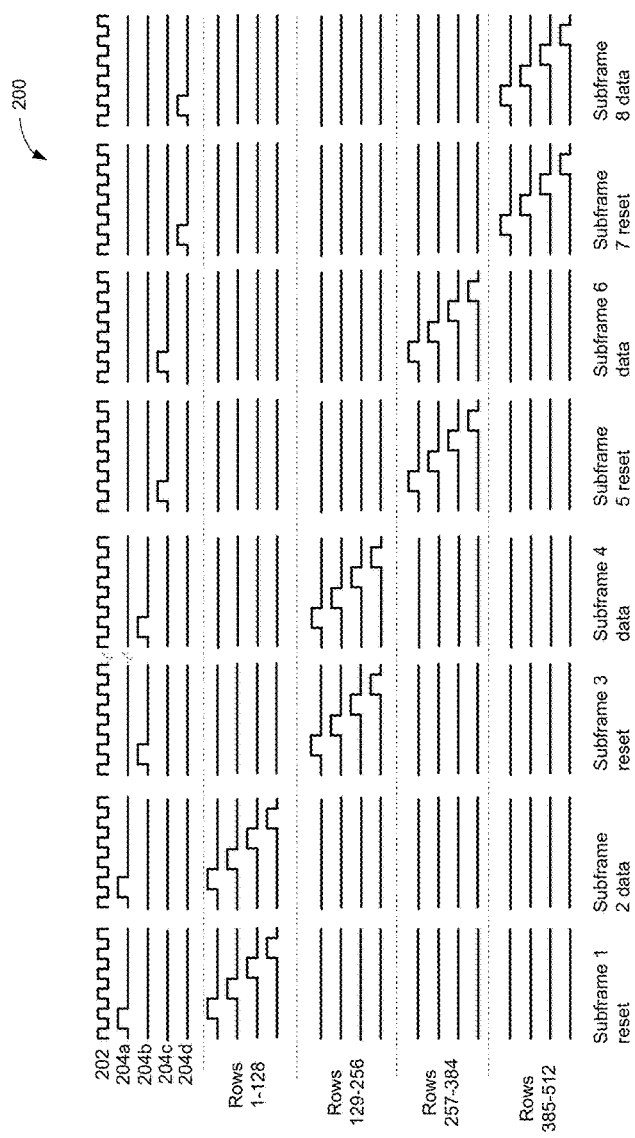
FIG. 2 illustrates an example of a timing diagram for a block driving scheme, according to some embodiments.

FIG. 2 illustrates an example of a timing diagram 200 for a block driving scheme that illustrates the timing for the eight subframes. The first line 202 illustrates a control signal provided by the timing controller 102 for shifting data within shift registers (not illustrated) within the gate driver 106. In the example of FIG. 2, since there are four blocks defined, four shift registers are included within the gate driver 106, i.e. one shift register for each block. More or fewer blocks and shift registers may be provided if desired. A second set of lines 204 illustrate the start pulse input/output of the four shift registers.

At the rising edge of each control signal, data is shifted among the four shift registers to apply a signal to the corresponding line or row S, depending upon the second set of lines 204. As previously noted, for lines or rows S of electrowetting display elements 120, the gate driver 106 selectively resets the corresponding electrowetting elements 120 during subframes 1, 3, 5 and 7, and then charges the corresponding electrowetting elements 120 to display data values during subframes 2, 4, 6 and 8. Thus, when line 204a is pulsed, subframe 1 or 2 is activated depending upon a shift direction control pin (not illustrated). Likewise, when line 204b is pulsed, subframe 3 or 4 is activated. When line 204c is pulsed, subframe 5 or 6 is activated and when line 204d is pulsed, subframe 7 or 8 is activated.

In accordance with another embodiment, an interlaced driving scheme is utilized for driving data within the electrowetting display panel 110. In such a scheme, each subframe only drives every Nth line. For an example, assume there are 512 lines or rows (corresponding to the scan lines S) in the electrowetting display panel 110. For this example, if N=4 (i.e., there are four blocks of lines), then lines 1, 5, 9, 13, etc., through 509 are selected for reset and display data writing, respectively, during subframes 1 and 2. Likewise, during subframes 3 and 4, lines 2, 6, 10, 14, etc., through 510 are selected for reset and display data writing, respectively. During subframes 5 and 6, lines 3, 7, 11, 15, etc., through 511 are selected for reset and display data writing, respectively. Finally, during subframes 7 and 8, lines 4, 8, 12, 16, etc., through 512 are selected for resetting and display data writing, respectively. Thus, once again, in each subframe, only one quarter of the total lines of the electrowetting display are selected for resetting or data writing of the electrowetting elements 120 via the lines or rows. More or fewer rows and/or blocks may be included if desired.

In order to implement the interlaced driving scheme, a barrel shifter (not illustrated) may be included in the gate driver 106. As is known, a barrel shifter is generally a digital circuit that can shift data by a specified number of bits in one clock cycle. It can be implemented as a sequence of multiplexers, and in such an implementation the output of one multiplexer is connected to the input of the next multiplexer in a way that depends on the shift distance. For example, at the start of a subframe, i.e., the rising edge of a control signal, a start input is sensed at the first location of the barrel shifter. At each rising edge of the clock signal, the shift register is shifted depending on shift control signals. Several sequences are possible. For example, an output sequence of the shift register can be 1, 2, 3, 4 . . . 128 or 1, 3, 5, 7, 9 . . . 127 or 2, 4, 6, 8, . . . 128 etc. for a barrel shift block with 128 outputs. Additionally, reversed sequences are possible. A barrel shifter (not illustrated) may be included in the gate driver 106 to implement the block driving scheme described previously.

Figure 3A:
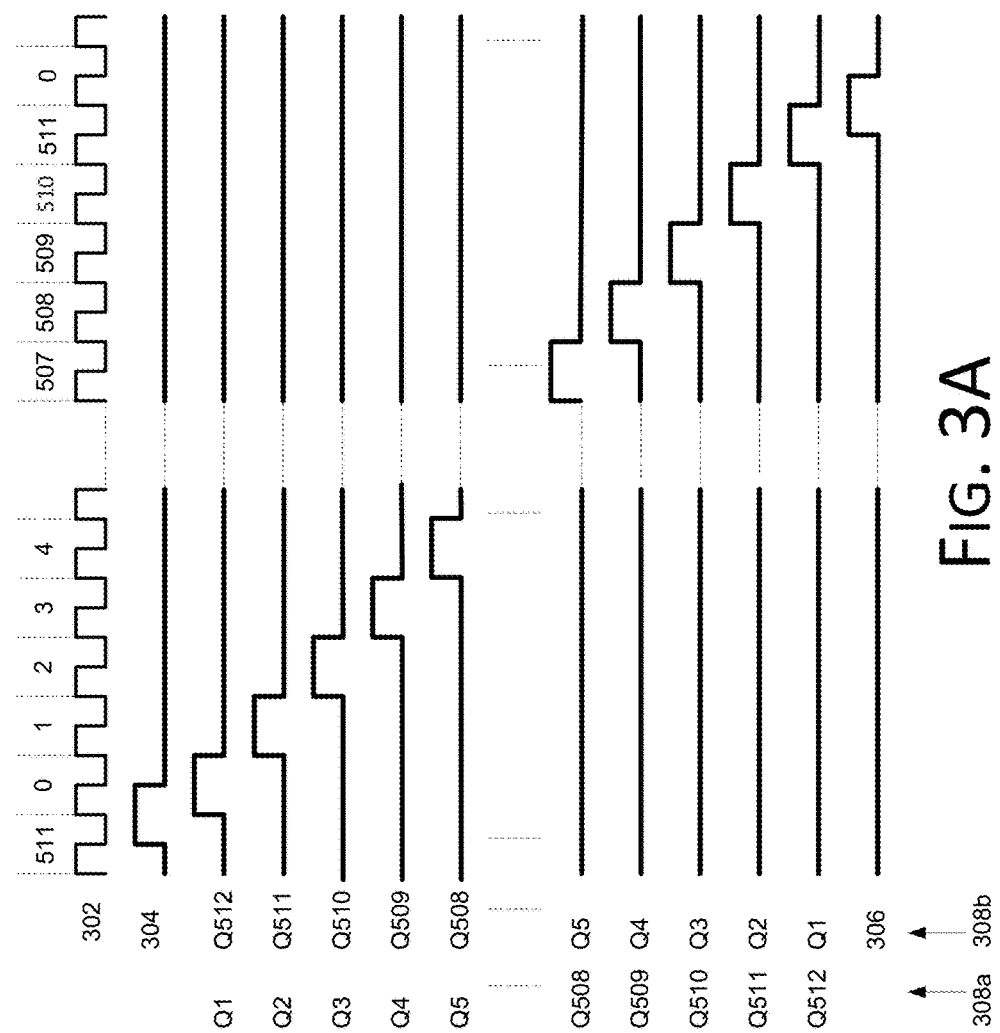
FIGS. 3A-3G illustrate examples of timing diagrams for an interlaced driving scheme, according to some embodiments.
Figure 3B:
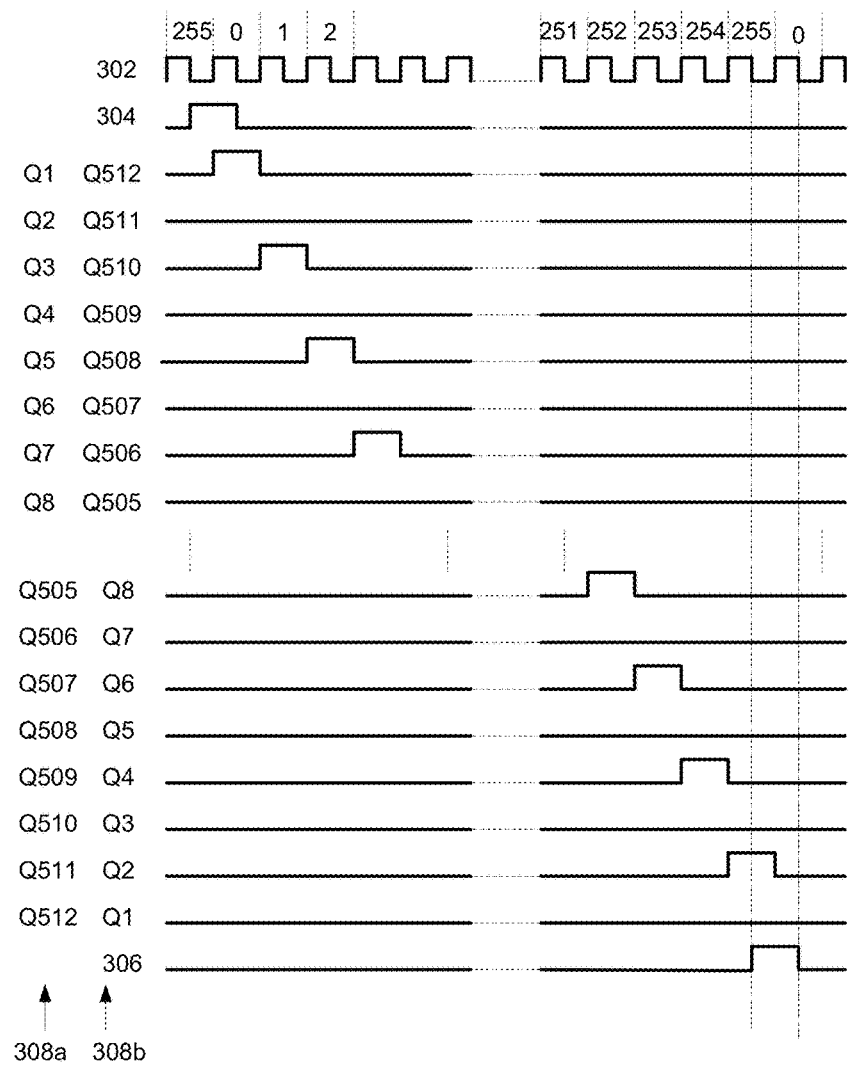
Figure 3C:
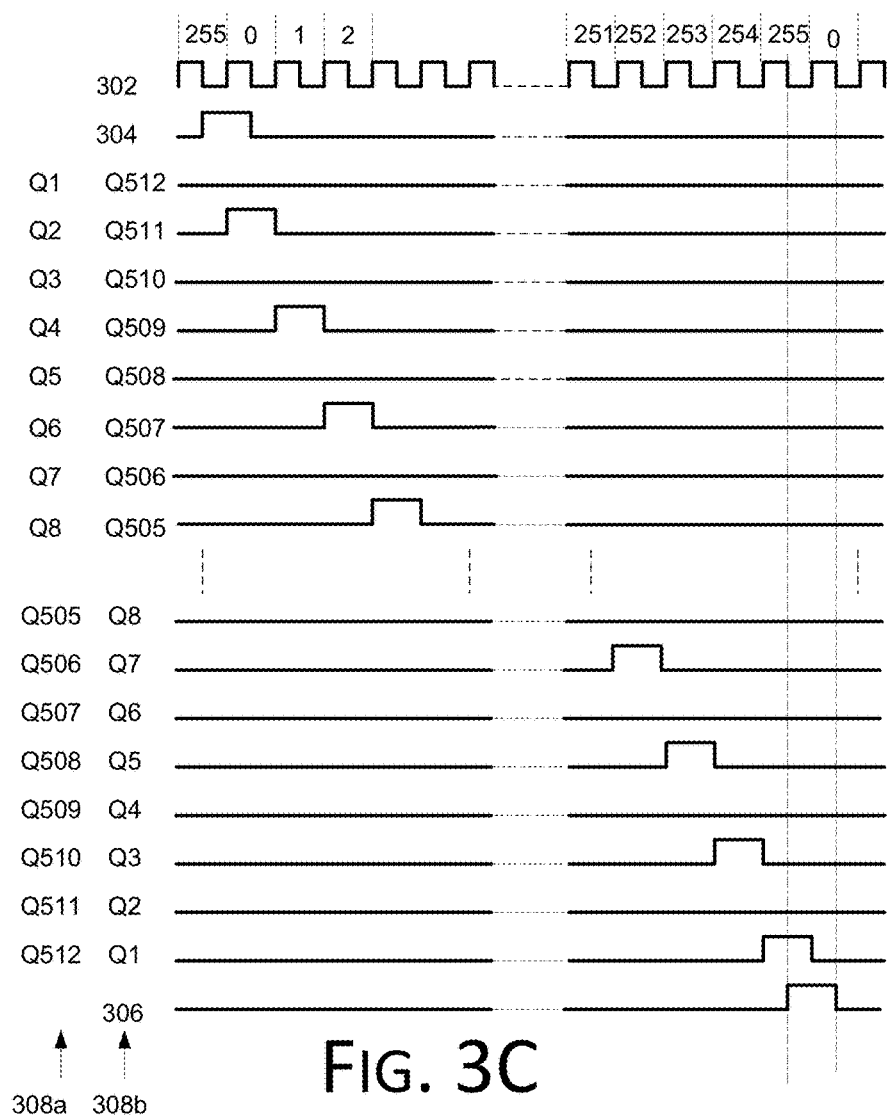
Figure 3D:
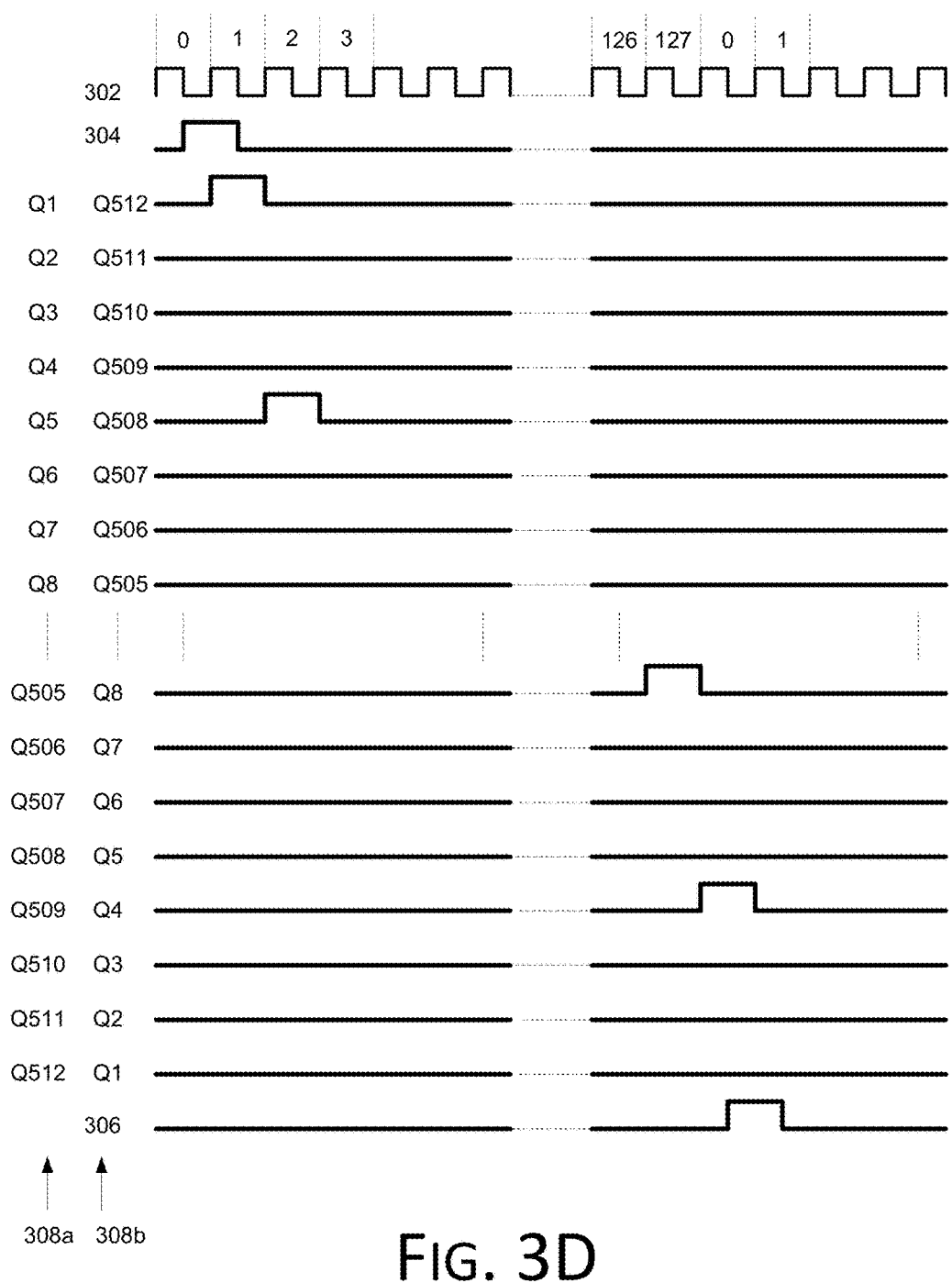
Figure 3E:
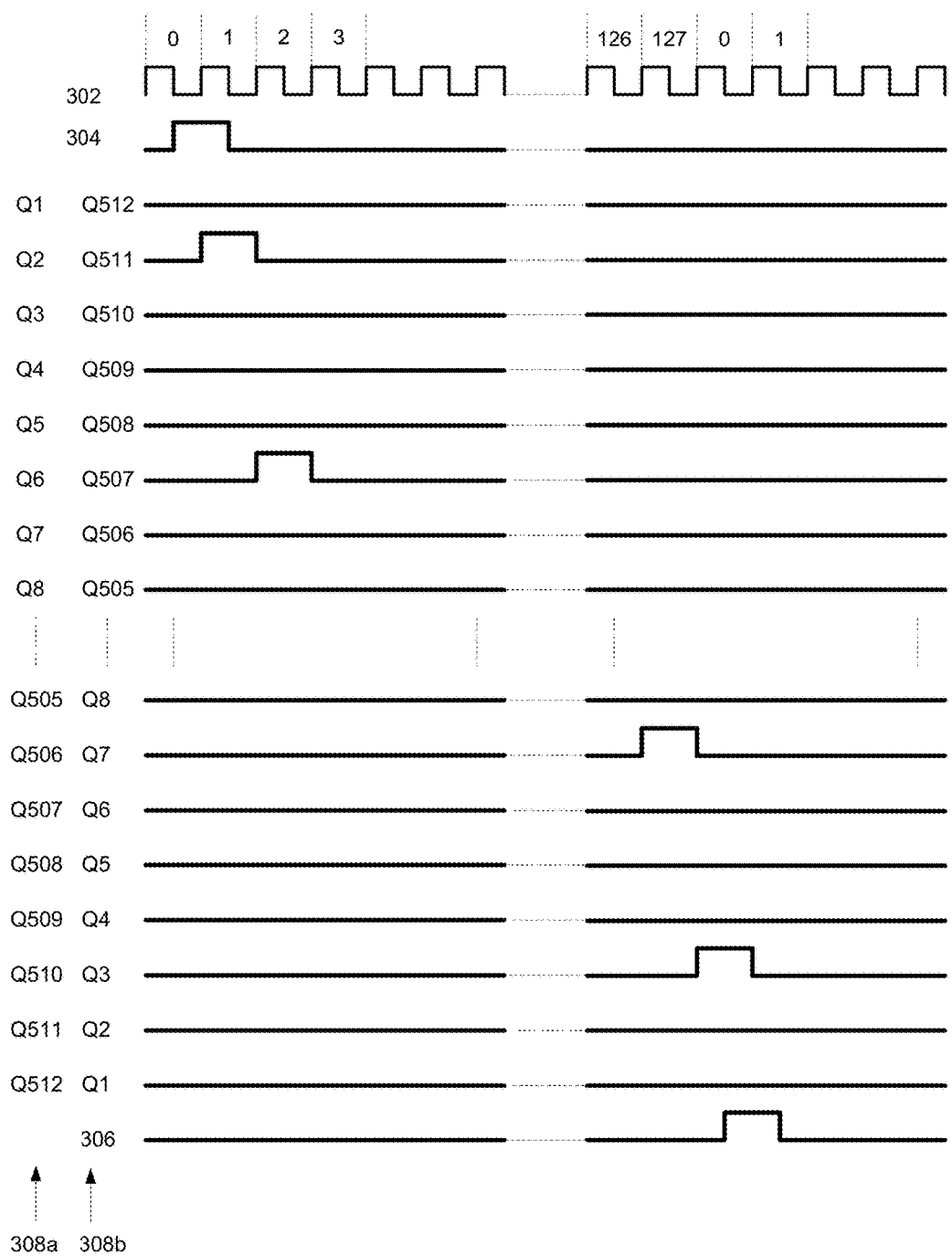
Figure 3F:
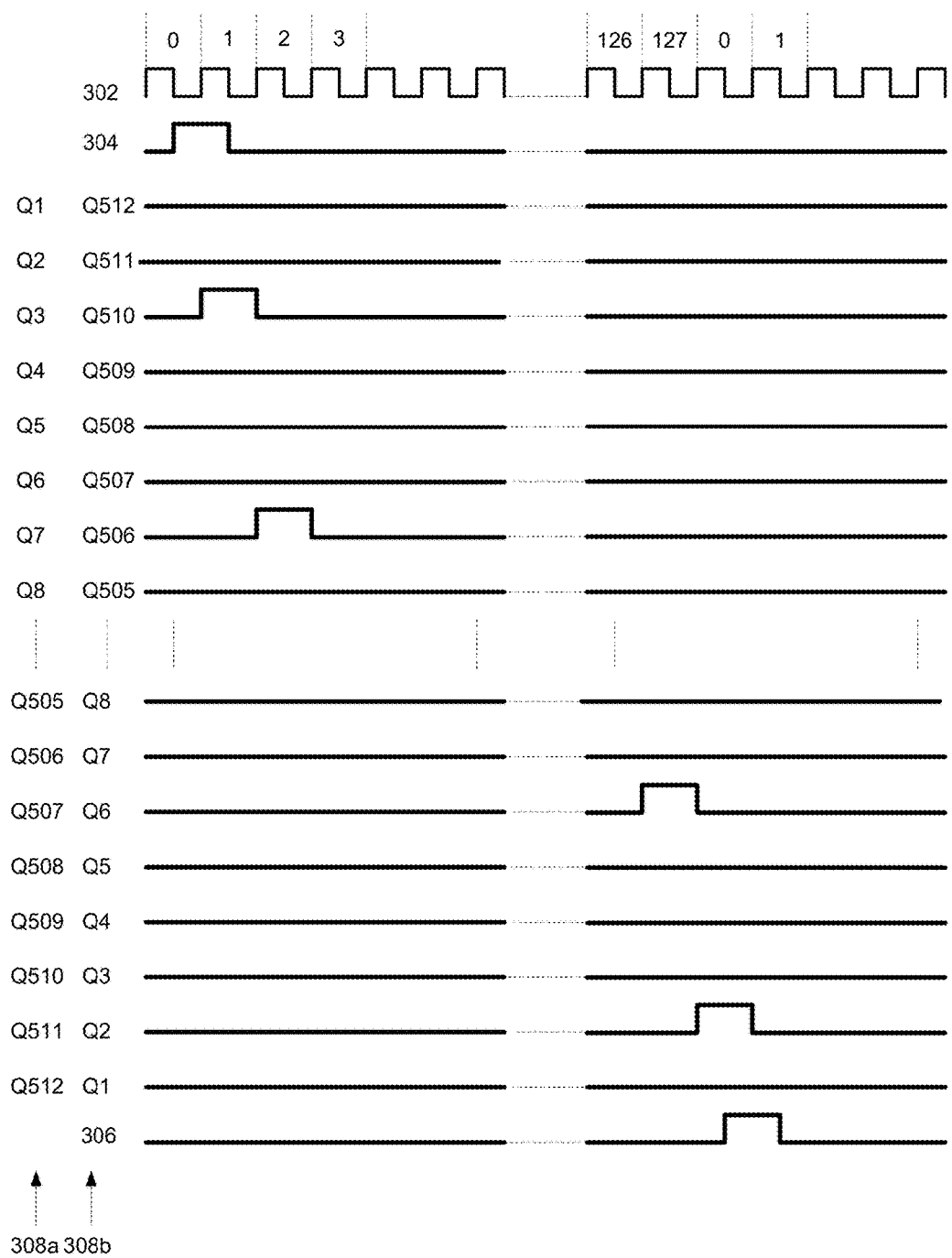
Figure 3G:
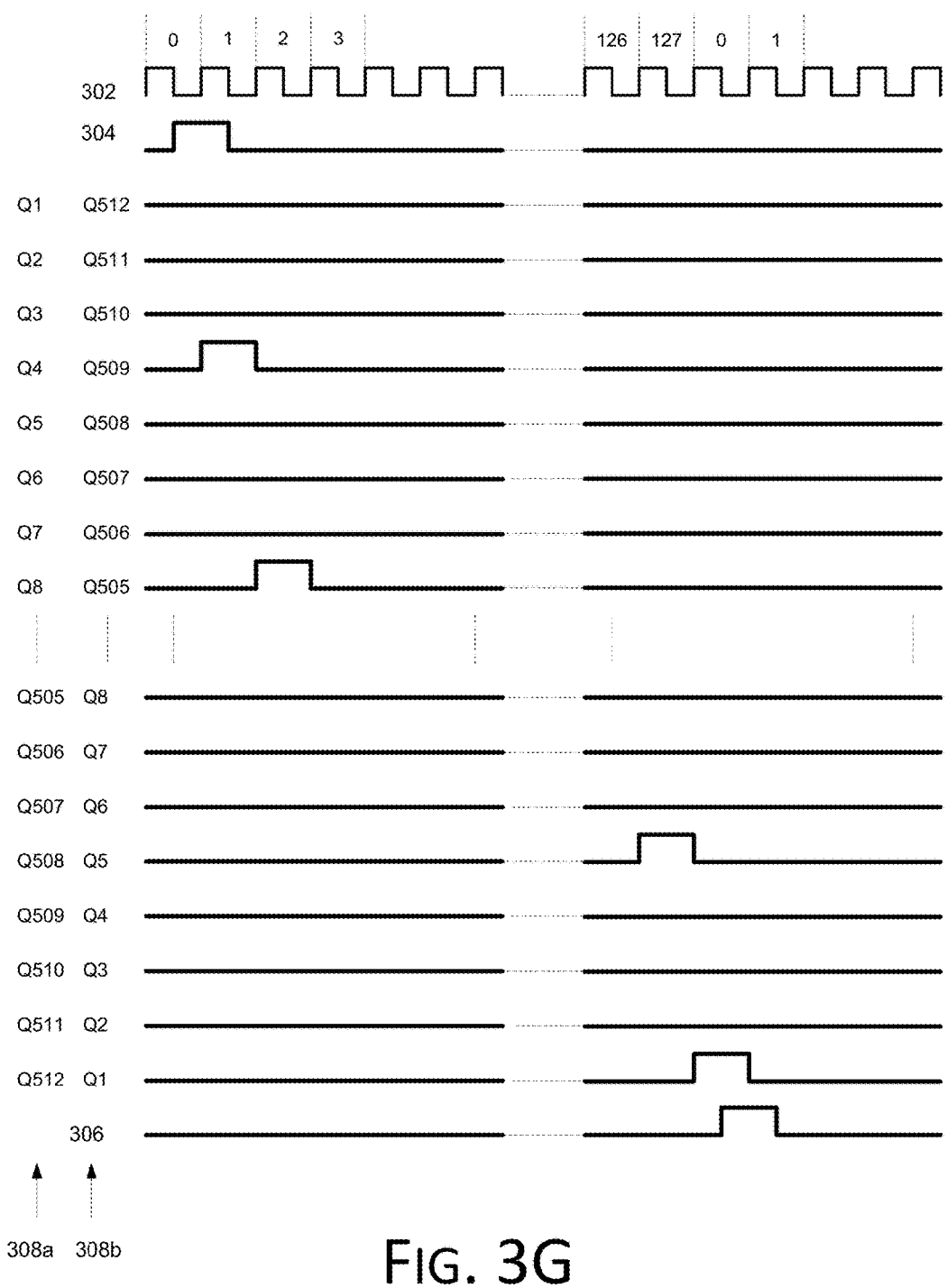

FIGS. 3A-3G illustrate examples of timing diagrams for an interlaced driving scheme. The timing diagrams are based upon a control signal 302 for the barrel shift registers. Lines 304 and 306 represent the start pulse for an input/output for the four barrel shift register blocks. Based upon a shift direction of output of the barrel shift registers, represented by column 308a and column 308b, a particular line or row is written to. FIG. 3A is a timing diagram that illustrates a default for the barrel shifter for a barrel shift output having an output line sequence of lines 1, 2, 3, . . . 512. FIG. 3B illustrates a barrel shift output line sequence of lines 1, 3, 5, . . . 511. FIG. 3C represents a start/end line of lines 2, 6, 10, . . . , 510. FIG. 3D illustrates barrel shift output line sequence of lines 1, 5, 9, . . . 509. FIG. 3E represent a start/end line of lines 2, 6, 10, . . . , 510. FIG. 3F represents a start/end line of lines 3, 7, 11, . . . , 511. FIG. 3G represents a start/end line of lines 4, 8, 12, . . . , 512.

While in embodiments the gate driver 106 may be configured to perform only one of the interlaced driving scheme or the block driving scheme, in accordance with various embodiments, the gate driver 106 is configured to perform both the interlaced driving scheme and the block driving scheme. Thus, depending upon the application, either driving scheme can be utilized for the electrowetting display panel 110. Additionally, it is possible to switch between the two types of driving schemes if desired. Other driving schemes may also be included and utilized in the gate driver 106. The electrowetting display panel 110 can switch between any of driving schemes included in the gate driver 106. Reasons for switching can include, but are not limited to, energy usage, timing requirements, etc. Additionally, the sequence of blocks being driven within an input frame in the block driving scheme and the interlaced driving scheme can be varied. For example, when N=4 (i.e. there are four blocks of lines), the order of blocks of lines being driven within an input frame can be block 3, block 1, block 4 and block 2, or block 4, block 1, block 3 and block 2, etc. The order can also vary from input frame to input frame, with the variation of the order being random or predetermined.

Generally, the gate driver 106 is implemented in a separate integrated circuit chip. An example of packaging for the integrated circuit is chip on glass (COG) type packaging. Another example of packaging for the integrated circuit is chip on film (COF) type packaging.

Figure 4:
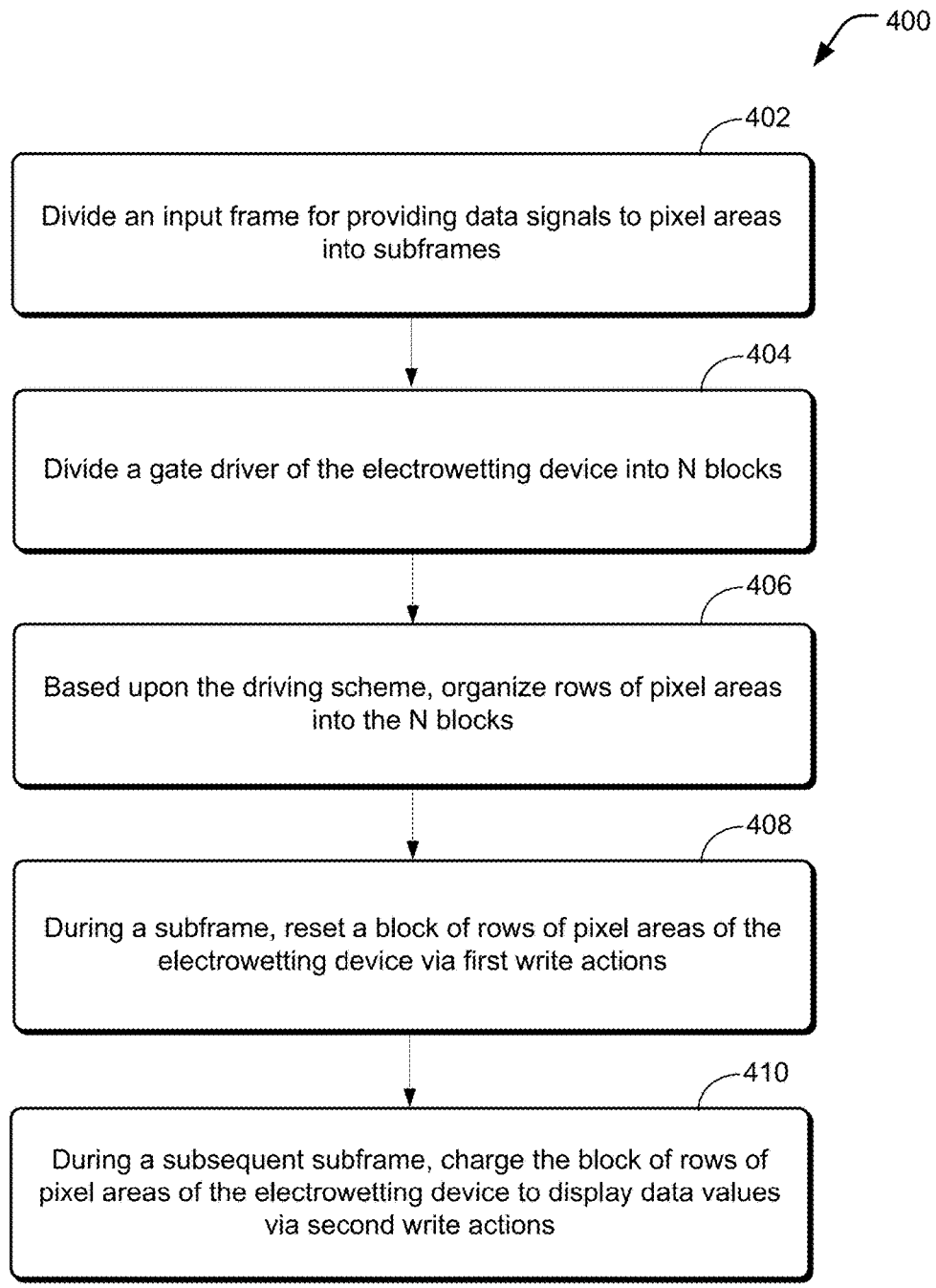
FIG. 4 is a flowchart illustrating a process of driving data signals for pixel areas of an electrowetting device, according to various embodiments.

FIG. 4 is a flowchart illustrating a process 400 of driving data signals for pixel areas of an electrowetting device, for example an electrowetting device as described in FIGS. 1A and 1B, using a driving scheme. At 402, an input frame for providing data signals to pixel areas is divided into subframes. At 404, a gate driver of the electrowetting device is divided into N blocks. At 406, based upon the driving scheme, rows of pixel areas of the electrowetting device are organized into the N blocks. At 408, during a subframe, a block of rows of pixel areas of the electrowetting device is reset via first write actions. At 410, during a subsequent subframe, the block of rows of pixel areas of the electrowetting device is charged to display data values via second write actions.

Thus, by utilizing driving schemes in accordance with the present disclosure, only one quarter of the total lines or rows S of the electrowetting display panel 110 are selected in each subframe. The driving schemes select (generally sequentially) and drive blocks of rows of pixel areas. Thus, the total subframe time is decreased, thereby reducing the frequency of resets of each pixel of the electrowetting display panel 110.

While embodiments of the present disclosure have been described with respect to electrowetting displays, other types of displays can benefit from the present disclosure. For example, LCDs, electrophoretic displays, cholesteric LCDs, and other display technologies that utilize fluids can benefit from the present disclosure and thus, the present disclosure is not limited to electrowetting displays. For such displays, a driver that drives the display will be configured as described herein with respect to the gate driver 106 and use driving schemes as described herein.

Figure 5:
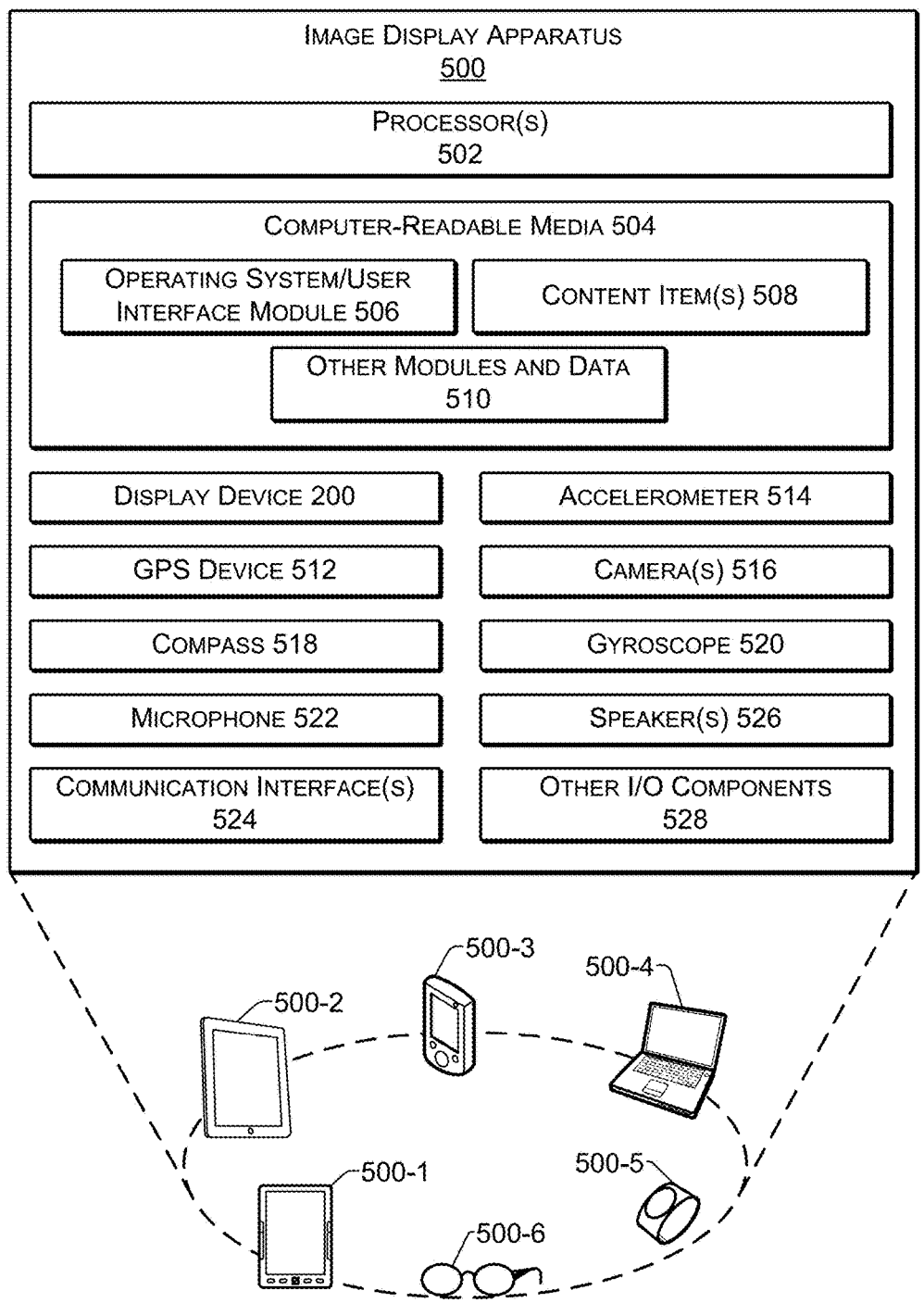
FIG. 5 illustrates select components of an example image display apparatus that may include an electrowetting display, according to various embodiments.

FIG. 5 illustrates select example components of an example image display apparatus 500 that may be used with the electrowetting display device 100 according to some implementations. Other types of displays may also be used with the example image display apparatus 500. Such types of displays include, but are not limited to, LCDs, cholestric displays, electrophoretic displays, electrofluidic pixel displays, photonic ink displays, and the like.

The image display apparatus 500 may be implemented as any of a number of different types of electronic devices. Some examples of the image display apparatus 500 may include digital media devices and eBook readers 500-1; tablet computing devices 500-2; smart phones, mobile devices and portable gaming systems 500-3; laptop and netbook computing devices 500-4; wearable computing devices 500-5; augmented reality devices, helmets, goggles or glasses 500-6; and any other device capable of connecting with the electrowetting display device 100 and including a processor and memory for controlling the display according to the techniques described herein.

In a very basic configuration, the image display apparatus 500 includes, or accesses, components such as at least one control logic circuit, central processing unit, or processor 502, and one or more computer-readable media 504. Each processor 502 may itself comprise one or more processors or processing cores. For example, the processor 502 can be implemented as one or more microprocessors, microcomputers, microcontrollers, digital signal processors, central processing units, state machines, logic circuitries, and/or any devices that manipulate signals based on operational instructions. In some cases, the processor 502 may be one or more hardware processors and/or logic circuits of any suitable type specifically programmed or configured to execute the algorithms and processes described herein. The processor 502 can be configured to fetch and execute computer-readable instructions stored in the computer-readable media 504 or other computer-readable media. The processor 502 can perform one or more of the functions attributed to the timing controller 102, the source driver 104, and/or the gate driver 106 of the electrowetting display device 100. The processor 502 can also perform one or more functions attributed to a graphic controller (not illustrated) for the electrowetting display device.

Depending on the configuration of the image display apparatus 500, the computer-readable media 504 may be an example of tangible non-transitory computer storage media and may include volatile and nonvolatile memory and/or removable and non-removable media implemented in any type of technology for storage of information such as computer-readable instructions, data structures, program modules or other data. The computer-readable media 504 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the image display apparatus 500 may access external storage, such as RAID storage systems, storage arrays, network attached storage, storage area networks, cloud storage, or any other medium that can be used to store information and that can be accessed by the processor 502 directly or through another computing device or network. Accordingly, the computer-readable media 504 may be computer storage media able to store instructions, modules or components that may be executed by the processor 502.

The computer-readable media 504 may be used to store and maintain any number of functional components that are executable by the processor 502. In some implementations, these functional components comprise instructions or programs that are executable by the processor 502 and that, when executed, implement operational logic for performing the actions attributed above to the image display apparatus 500. Functional components of the image display apparatus 500 stored in the computer-readable media 504 may include the operating system and user interface module 506 for controlling and managing various functions of the image display apparatus 500, and for generating one or more user interfaces on the electrowetting display device 100 of the image display apparatus 500.

In addition, the computer-readable media 504 may also store data, data structures and the like, that are used by the functional components. For example, data stored by the computer-readable media 504 may include user information and, optionally, one or more content items 508. Depending on the type of the image display apparatus 500, the computer-readable media 504 may also optionally include other functional components and data, such as other modules and data 510, which may include programs, drivers and so forth, and the data used by the functional components. Further, the image display apparatus 500 may include many other logical, programmatic and physical components, of which those described are merely examples that are related to the discussion herein. Further, while the figures illustrate the functional components and data of the image display apparatus 500 as being present on the image display apparatus 500 and executed by the processor 502 on the image display apparatus 500, it is to be appreciated that these components and/or data may be distributed across different computing devices and locations in any manner.

FIG. 5 further illustrates examples of other components that may be included in the image display apparatus 500. Such examples include various types of sensors, which may include a GPS device 512, an accelerometer 514, one or more cameras 516, a compass 518, a gyroscope 520, a microphone 522, and so forth.

The image display apparatus 500 may further include one or more communication interfaces 524, which may support both wired and wireless connection to various networks, such as cellular networks, radio, Wi-Fi networks, close-range wireless connections, near-field connections, infrared signals, local area networks, wide area networks, the Internet, and so forth. The communication interfaces 524 may further allow a user to access storage on or through another device, such as a remote computing device, a network attached storage device, cloud storage, or the like.

The image display apparatus 500 may further be equipped with one or more speakers 526 and various other input/output (I/O) components 528. Such I/O components 528 may include a touchscreen and various user controls (e.g., buttons, a joystick, a keyboard, a keypad, etc.), a haptic or tactile output device, connection ports, physical condition sensors, and so forth. For example, the operating system 506 of the image display apparatus 500 may include suitable drivers configured to accept input from a keypad, keyboard, or other user controls and devices included as the I/O components 528. Additionally, the image display apparatus 500 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display device comprising:
 a plurality of pixel areas arranged to define a plurality of rows of pixel areas, wherein each pixel area comprises:
  a hydrophobic surface;
  an electrowetting oil;
  a fluid that includes an electrolyte;
  a pixel electrode under the hydrophobic surface; and
  a thin film transistor coupled to the pixel electrode and a voltage source,
  wherein the pixel area is operated by applying a voltage via the thin film transistor and the voltage source to the hydrophobic surface via the pixel electrode in conjunction with a common electrode such that the voltage causes the hydrophobic surface to become more hydrophilic, allowing the fluid that includes the electrolyte to move onto the hydrophobic surface to substantially displace a portion of the electrowetting oil on the hydrophobic surface;
 a plurality of gate lines, wherein each gate line is connected to the thin film transistors of at least some of the pixel areas in a respective row of the plurality of rows; and
 a gate driver coupled to the plurality of gate lines and configured to:
  define a first block of rows of the plurality of rows of the pixel areas based at least in part on a predetermined driving scheme;
  define a second block of rows of the plurality of rows of the pixel areas based at least in part on the predetermined driving scheme;
  during a first input frame:
   during a first subframe, reset the first block and the second block in a first order via first write actions to the gate lines;
   during a subsequent second subframe, charge the first block and the second block in the first order to display first data values via second write actions to the gate lines, the first data values associated with the first input frame; and
  during a second input frame subsequent to the first input frame:
   during a third subframe, reset the first block and the second block in a second order via third write actions to the gate lines, wherein the second order is different from the first order; and
   during a subsequent fourth subframe, charge the first block and the second block in the second order to display second data values via fourth write actions to the gate lines, the second data values associated with the second input frame.

2. The electrowetting display device of claim 1, wherein:
 the gate driver is configured to define a plurality of blocks of sequentially numbered rows of the plurality of rows based on the predetermined driving scheme being a block driving scheme; and
 the plurality of blocks comprises the first block and the second block.

3. The electrowetting display device of claim 1, wherein:
 the gate driver is configured to define a plurality of blocks of interlaced numbered rows of the plurality of rows based on the predetermined driving scheme being an interlaced driving scheme; and
 the plurality of blocks comprises the first block and the second block.

4. A display device comprising:
 a plurality of pixel areas arranged in rows and columns; and
 a driver that drives rows of pixel areas of the display device during input frames, wherein the driver is configured to:
  drive the rows of pixel areas using a driving scheme that selects and drives multiple blocks during respective subframes of the input frames, each block comprising multiple rows of pixel areas;

determine, randomly, a first order of driving the multiple blocks for a first input frame of the input frames;

determine, randomly, a second order of driving the multiple blocks for a second input frame of the input frames, wherein the second order is different from the first order;

at least partly during the first input frame, for blocks of the multiple blocks in the first order:
at least partly during a respective first subframe, reset the block; and
at least partly during a respective, subsequent second subframe, charge the block to display respective first data associated with the first input frame; and at least partly during the second input frame, for blocks of the multiple blocks in the second order:
at least partly during a respective third subframe, reset the block; and
at least partly during a respective, subsequent fourth subframe, charge the block to display respective second data associated with the second input frame.

5. The display device of claim 4, wherein rows of pixel areas are arranged in the multiple blocks having sequentially numbered rows.

6. The display device of claim 4, wherein:
the multiple blocks comprise four blocks,
there are 512 rows of pixel areas,
a first block of rows includes rows 1-128,
a second block of rows includes rows 129-256,
a third block of rows includes rows 257-384, and
a fourth block of rows includes rows 385-512.

7. The display device of claim 4, wherein the driver comprises barrel shift registers.

8. The display device of claim 4, wherein the rows of pixel areas are arranged in the multiple blocks having interlaced numbered rows.

9. The display device of claim 8, wherein:
the at least two blocks comprise four blocks,
the driver comprises a barrel shifter that includes four barrel shift registers,
there are 512 rows of pixel areas,
a first block of rows includes rows 1, 5, 9, . . . , 509,
a second block of rows includes rows 2, 6, 10, . . . , 510,
a third block of rows includes rows 3, 7, 11, . . . , 511, and
a fourth block of rows includes rows 4, 8, 12, . . . , 512.

10. A method of driving data signals for pixel areas of an electrowetting device using a driving scheme, the method comprising:
dividing a gate driver of the electrowetting device into at least two blocks;
based upon the driving scheme, organizing rows of pixel areas of the electrowetting device into the at least two blocks, each of the at least two blocks including a plurality of the rows of pixel areas;
at least partly during a first frame time, for each of the at least two blocks in a first order:
at least partly during a corresponding first subframe, resetting the block via first write actions; and
at least partly during a subsequent corresponding second subframe, charging the block to display data values via second write actions, the data values associated with a first input frame for providing data signals to pixel areas of the electrowetting device; and at least partly during a second frame time, for each of the at least two blocks in a second order different from the first order:
at least partly during a corresponding first subframe, resetting the block via third write actions; and
at least partly during a subsequent corresponding second subframe, charging the block to display data values via fourth write actions, the data values associated with a second input frame for providing data signals to pixel areas of the electrowetting device.

11. The method of claim 10, wherein the driving scheme is a block driving scheme and organizing rows of pixel areas of the electrowetting device comprises arranging the rows of pixel areas into blocks of sequentially numbered rows.

12. The method of claim 11, wherein the at least two blocks comprise four blocks, there are 512 rows of pixel areas, a first block of rows includes rows 1-128, a second block of rows includes rows 129-256, a third block of rows includes rows 257-384, and a fourth block of rows includes rows 385-512.

13. The method of claim 10, wherein the driving scheme is an interlaced driving scheme and organizing rows of pixel areas of the electrowetting device comprises arranging the rows of pixel areas into blocks of interlaced numbered rows.

14. The method of claim 13, wherein the at least two blocks comprise four blocks, there are 512 rows of pixel areas, a first block of rows includes rows 1, 5, 9, . . . , 509, a second block of rows includes rows 2, 6, 10, . . . , 510, a third block of rows includes rows 3, 7, 11, . . . , 511, and a fourth block of rows includes rows 4, 8, 12, . . . , 512.

15. The method of claim 10, further comprising varying the driving scheme between an interlaced driving scheme and a block driving scheme.

16. The method of claim 10, further comprising varying an order of driving the at least two blocks during a plurality of input frames.

17. The method of claim 16, wherein varying the order of driving the at least two blocks during the input frames comprises driving the at least two blocks in a random order from input frame to input frame.

18. A method of driving data signals for pixel areas of an electrowetting device using one or more driving schemes during input frames, the method comprising:
dividing a gate driver of the electrowetting device into at least two blocks;
based upon the one or more driving schemes, organizing rows of pixel areas of the electrowetting device into the at least two blocks, each of the at least two blocks comprising a respective plurality of the rows of pixel areas;
resetting, in a first block order, the at least two blocks of rows of pixel areas via first write actions during a first input frame;
charging, in the first block order, the at least two blocks of rows of pixel areas to display data values via second write actions during the first input frame;
resetting, in a second block order different from the first block order, the at least two blocks of rows of pixel areas via third write actions during a second input frame; and
charging, in the second block order, the at least two blocks of rows of pixel areas to display data values via fourth write actions during the second input frame.

19. The method of claim 18, wherein varying an order of driving the at least two blocks during a subsequent input frame with respect to a previous input frame comprises varying the order of driving the at least two blocks from input frame to input frame.

20. The method of claim 19, wherein varying an order of driving the at least two blocks during a subsequent input frame with respect to a previous input frame comprises varying the order of driving the blocks in a random order from input frame to input frame.

21. The method of claim 18, further comprising varying between an interlaced driving scheme and a block driving scheme.

22. The electrowetting display device of claim 1, wherein the gate driver is further configured to:
- define a plurality of blocks of rows of the plurality of rows of the pixel areas, the plurality of blocks of rows comprising the first block of rows and the second block of rows;
- during the first input frame, charge each block of rows of the plurality of blocks of rows in the first order, each block charged during a respective, different subframe of a first plurality of subframes, the first plurality of subframes comprising the second subframe; and
- during the second input frame, charge each block of rows of the plurality of blocks of rows in the second order, each block charged during a respective, different subframe of a second plurality of subframes, the second plurality of subframes comprising the fourth subframe.

23. The electrowetting display device of claim 22, wherein the electrowetting display device is configured to charge each pixel area to a corresponding display data value during only one subframe of the first plurality of subframes, and during only one subframe of the second plurality of subframes.

24. The electrowetting display device of claim 3, wherein the gate driver is configured to perform at least one of the first write actions, the second write actions, the third write actions, or the fourth write actions with respect to fewer than all of the gate lines.

25. The display device of claim 4, wherein the driver is configured to:
- define a first plurality of subframes during the first input frame, the first plurality of subframes comprising the respective second subframes for the blocks of the multiple blocks;
- define a second plurality of subframes during the second input frame, the second plurality of subframes comprising the respective fourth subframes for the blocks of the multiple blocks;
- during each subframe of the first plurality of subframes, charge a respective, different block of the multiple blocks, wherein each block of the multiple blocks is driven in the first order during the first input frame; and
- during each subframe of the second plurality of subframes, drive a respective, different block of the multiple blocks, wherein each block of the multiple blocks is driven in the second order during the second input frame.

26. The display device of claim 8, wherein the driver is configured to, during at least one subframe of the respective second subframes or the respective fourth subframes, drive fewer than all of the multiple rows associated with the respective block.

* * * * *